US012589269B2

(12) United States Patent
Chang et al.

(10) Patent No.: US 12,589,269 B2
(45) Date of Patent: Mar. 31, 2026

(54) BATTERY MODULE CAPABLE OF SUPPRESSING SPREAD OF BATTERY FIRE AND CONTROL METHOD OF SUPPRESSING SPREAD OF BATTERY FIRE THE SAME

(71) Applicant: DYNAPACK INTERNATIONAL TECHNOLOGY CORPORATION, Taoyuan City (TW)

(72) Inventors: Chung-Hsing Chang, Taoyuan City (TW); Wen-Yi Chen, Taoyuan City (TW); Way-Lung Wu, Taoyuan City (TW); Teng-Chi Huang, Taoyuan City (TW); Shi-Cheng Tong, Taoyuan City (TW); Yong-Han Chen, Taoyuan City (TW); Yu-Chun Wang, Taoyuan City (TW)

(73) Assignee: DYNAPACK INTERNATIONAL TECHNOLOGY CORPORATION, Taoyuan City (TW)

( * ) Notice: Subject to any disclaimer, the term of this patent is extended or adjusted under 35 U.S.C. 154(b) by 313 days.

(21) Appl. No.: 18/197,031

(22) Filed: May 12, 2023

(65) Prior Publication Data

US 2024/0374944 A1    Nov. 14, 2024

(51) Int. Cl.
*A62C 37/00*        (2006.01)
*A62C 3/16*         (2006.01)
*H01M 10/42*        (2006.01)
*H01M 10/48*        (2006.01)
*H01M 10/635*       (2014.01)
(Continued)

(52) U.S. Cl.
CPC .............. *A62C 3/16* (2013.01); *A62C 37/00* (2013.01); *H01M 10/425* (2013.01);
(Continued)

(58) Field of Classification Search
CPC ........ A62C 3/16; A62C 37/00; H01M 10/635; H01M 10/6563; H01M 50/204;
(Continued)

(56) References Cited

U.S. PATENT DOCUMENTS 5,607,787 A * 3/1997 Wedlake .................. A62C 3/16
429/62
7,433,794 B1 * 10/2008 Berdichevsky ......... B60L 58/22
320/150
(Continued)

FOREIGN PATENT DOCUMENTS

JP        H11176303 A      7/1999

OTHER PUBLICATIONS

Office Action dated Oct. 26, 2023 of the corresponding Taiwan patent application No. 112105887.

*Primary Examiner* — Chee-Chong Lee
(74) *Attorney, Agent, or Firm* — HDLS IPR SERVICES; Chun-Ming Shih

(57)                ABSTRACT

A battery module capable of suppressing spread of battery fire including a case, a plurality of battery packs, a plurality of temperature sensors, an energy consumption module and a controller. The case forms an accommodation space, and the battery packs is accommodated in the accommodation space. The temperature sensors are dispersedly configured to the accommodation space, and the temperature sensors respectively detect an ambient temperature around configure locations. The controller is coupled to the temperature sensors, and when the ambient temperature detected by one of the temperature sensors is greater than or equal to a first specific temperature range, the controller controls the energy consumption module to consume a battery capacity of at least one battery pack around the one of the temperature sensors.

20 Claims, 14 Drawing Sheets

(51) Int. Cl.

| | |
|---|---|
| *H01M 10/6563* | (2014.01) |
| *H01M 50/204* | (2021.01) |
| *H02J 7/52* | (2026.01) |

(52) U.S. Cl.
CPC ....... *H01M 10/482* (2013.01); *H01M 10/635* (2015.04); *H01M 10/6563* (2015.04); *H01M 50/204* (2021.01); *H02J 7/52* (2026.01); *H01M 2010/4271* (2013.01)

(58) Field of Classification Search
CPC ............. H01M 10/425; H01M 10/482; H01M 2010/4271; H02J 7/0014
USPC ........................................................... 169/61
See application file for complete search history.

(56) References Cited

U.S. PATENT DOCUMENTS

| | | | | |
|---|---|---|---|---|
| 7,698,078 | B2 * | 4/2010 | Kelty ................... | B60L 53/305 |
| | | | | 702/182 |
| 7,736,799 | B1 * | 6/2010 | Hermann ............ | H01M 10/653 |
| | | | | 429/177 |
| 9,093,726 | B2 * | 7/2015 | Prilutsky ............. | H01M 10/613 |
| 2007/0009787 | A1 * | 1/2007 | Straubel .............. | H01M 10/643 |
| | | | | 429/100 |
| 2008/0251235 | A1 * | 10/2008 | Zhou ....................... | B60L 58/26 |
| | | | | 165/59 |
| 2010/0297513 | A1 * | 11/2010 | Yasuda ............. | H01M 8/04164 |
| | | | | 429/423 |

\* cited by examiner

100

100A

3

1

52

7

8

BATTERY MODULE CAPABLE OF SUPPRESSING SPREAD OF BATTERY FIRE AND CONTROL METHOD OF SUPPRESSING SPREAD OF BATTERY FIRE THE SAME

BACKGROUND

Technical Field

The present disclosure relates to a battery module and a control method the same, and more particularly to the battery module capable of suppressing spread of battery fire and the control method of suppressing spread of battery fire the same.

Description of Related Art

Lithium batteries have been widely used in consumer 3C product, electric vehicle and Backup Battery Unit (BBU) due to their advantages of light-weight, compactness and high energy density. In recent years, the demand for battery has grown rapidly, and the application of lithium battery in Energy Storage System (ESS) has drastically changed from kilo-Watt to Mega-Watt, or Giga-Watt.

However, with the occurrence of many lithium battery fire accidents in recent years, it has been confirmed that even under multiple protections such as Battery Management System (BMS) and mechanical structure, there is still a potential risk of spontaneous combustion due to heat generation. It not only hurts the image of the company, but also affects the investment willingness and market plan of the company. Besides, it also has a serious impact on the development of the lithium battery industry.

In response to the problem of lithium battery fire accidents by the internal short-circuit, the International Electrotechnical Commission (IEC) and Underwriters Laboratories (UL) have successively formulated the test methods for internal short-circuit of battery cells and the spread of battery fire in the battery system, and then extended clear specifications and regulations, for example but not limited to, IEC-62619, UL1973, UL9540A and other related safety standards and their certification methods. The international community obviously has paid close attention to the issue of lithium battery thermal runaway and fire accidents, so the technology to prevent the spread of battery fire has also been highly valued by the industry.

On the other hand, in one example, IEC-62619, UL1973, and UL9540A define thermal runaway as a phenomenon in which the exothermic reaction inside the battery cells causes a rapid rise in temperature. As shown in FIG. 1A, since the battery pack 1 (for example but not limited to, lithium battery) in the battery module 100 has high energy density and contains combustible components therein: an isolation film of the battery pack 1 may be hot melting, or broken hole by internal stress due to factors such as high temperature, overcharging, impact, electronic control system error or process flaws, resulting plates of battery pack 1 contact to form a short circuit and a high-temperature chemical reaction occurs. Subsequently, it usually takes some time from the abnormal temperature rise of the battery cells inside the first battery pack 1 to thermal runaway, the generated high heat or flame tends to cause successive thermal runaway of the battery cells in the adjacent battery pack 1, so that excessive heat is accumulated in the battery pack 1 until the battery pack 1 is completely burnt out. Finally, as shown in FIG. 1B, the case of the battery module 100 is broken due to its burning through by an open flame, and cannot satisfy the requirements of the above specifications.

Therefore, it is a major topic for the inventors of the present disclosure to design a battery module capable of suppressing spread of battery fire and a control method of suppressing spread of battery fire the same to suppress the impact caused by flame spread.

SUMMARY

In order to solve the above-mentioned problems, the present disclosure provides a battery module capable of suppressing spread of battery fire. The battery module includes a case, a plurality of battery packs, a plurality of temperature sensors, an energy consumption module and a controller. The case forms an accommodation space, and the battery packs is accommodated in the accommodation space. The temperature sensors are dispersedly configured to the accommodation space, and the temperature sensors are configured to respectively detect an ambient temperature around configure locations in the accommodation space. The controller is coupled to the temperature sensors, and the controller is configured to control the energy consumption module to consume a battery capacity of at least one battery pack around one of the temperature sensors based on the ambient temperature detected by the one of the temperature sensors being greater than or equal to a first specific temperature range.

In order to solve the above-mentioned problems, the present disclosure provides a control method of suppressing spread of battery fire. The control method is applied to a battery module including a case, the battery module further includes a plurality of battery packs connected in series or in parallel, a plurality of temperature sensors dispersedly configured to an accommodation space of the case, an energy consumption module. The control method includes steps of: determining whether an ambient temperature detecting by one of the temperature sensors being greater than or equal to a first specific temperature range, activating the energy consumption module to enter an energy consumption mode when the ambient temperature detected by the one of the temperature sensors is greater than or equal to the first specific temperature range. The energy consumption mode includes a step of: (a) controlling the energy consumption module to consume the battery capacity of at least one battery pack around one of the temperature sensors.

In one embodiment, the main purpose and effect of the present disclosure is that the battery module uses the controller to control the energy consumption module to consume the battery capacity of the abnormal battery pack, so as to suppress the impact caused by the spread of the battery fire, and also ensure that the battery fire does not spread completely after thermal runaway of the battery cell and improves the safety of the battery system.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
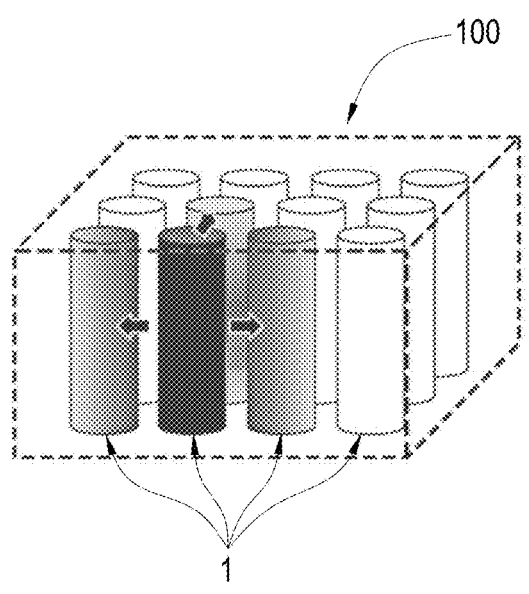
FIG. 1A is a schematic diagram of the fire spread of the battery pack inside a related-art battery module.

Reference will now be made to the drawing figures to describe the present disclosure in detail. It will be understood that the drawing figures and exemplified embodiments of present disclosure are not limited to the details thereof.

Figure 1B:
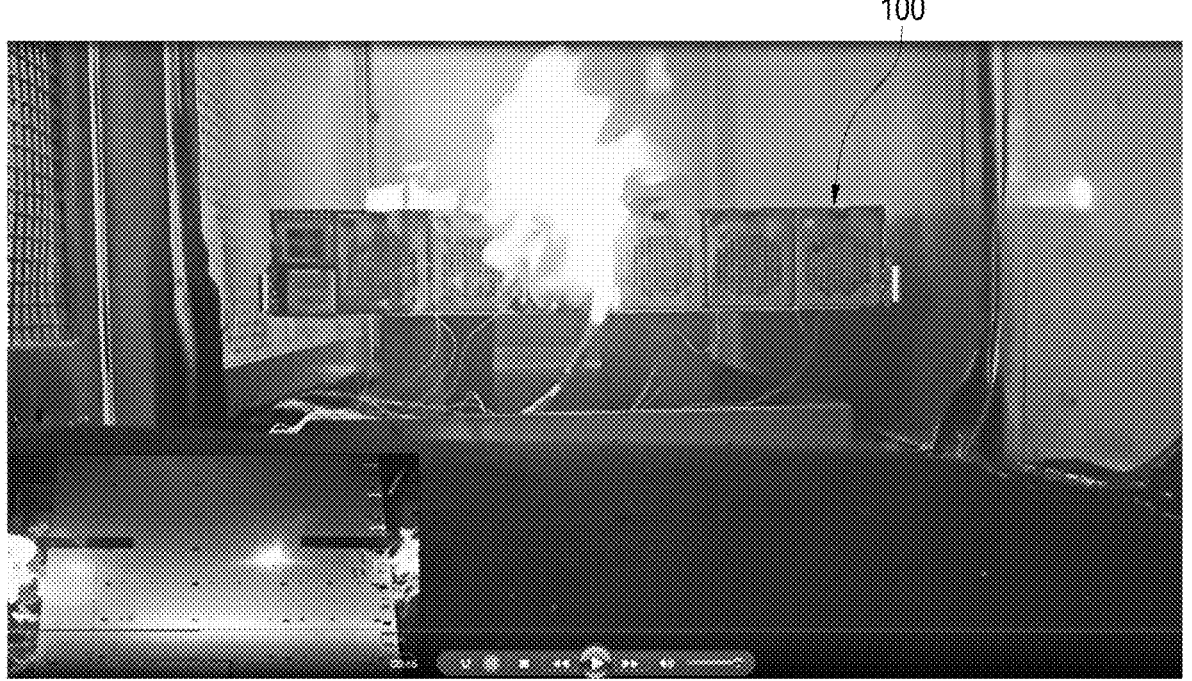
FIG. 1B is a photo of experimental results of the battery generating an open flame through the battery fire spread test in the related art.
Figure 2A:
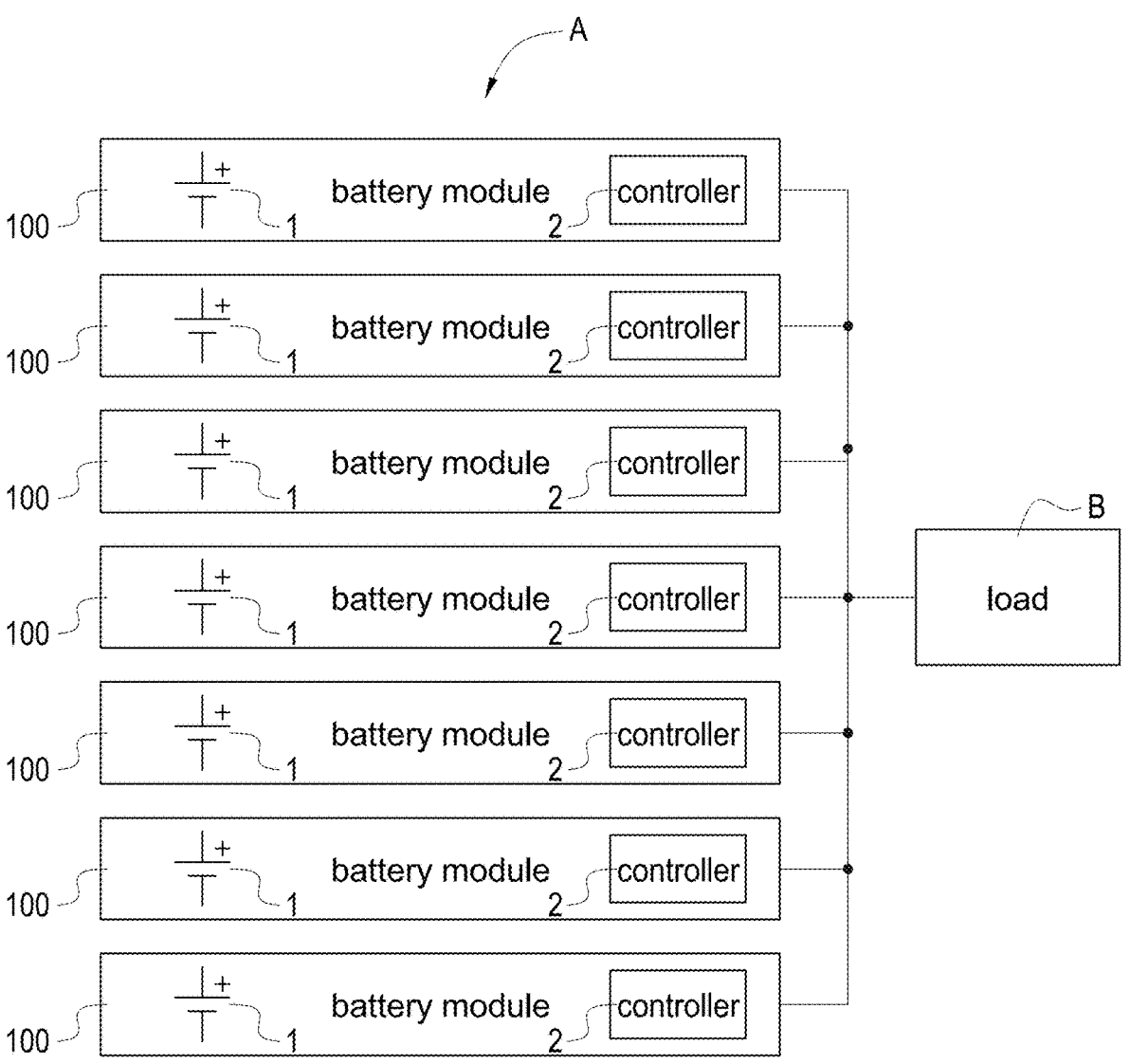
FIG. 2A is a block circuit diagram of an energy storage device capable of suppressing spread of battery fire of the present disclosure.

Please refer to FIG. 2A, which shows a block circuit diagram of an energy storage device capable of suppressing spread of battery fire of the present disclosure, and also refer to FIGS. 1A-1B. The energy storage device A is used to supply power to a back-end system (hereinafter referred to as a load B), and the load B is, for example but not limited to, server(s), electric power supply system(s) and other devices requiring battery backup power supply. The energy storage device A includes at least one battery module 100, and the battery module 100 includes a plurality of battery packs 1 and a controller 2 connected in series or in parallel. The battery module 100 may be regarded as Backup Battery Unit (BBU), and each battery pack 1 may include a single battery or several batteries therein. The controller 2 may detect various parameters of the battery module 100 (the various parameters are, for example but not limited to, voltage, and current), and control charging and discharging operations of the battery module 100. In addition, in one embodiment, the controller 2 may further provide a function of suppressing spread of battery fire of the battery module 100, and the controller 2 may be, for example but not limited to, microcontroller(s), programmable controller(s) and other components with signal processing functions.

Figure 2B:
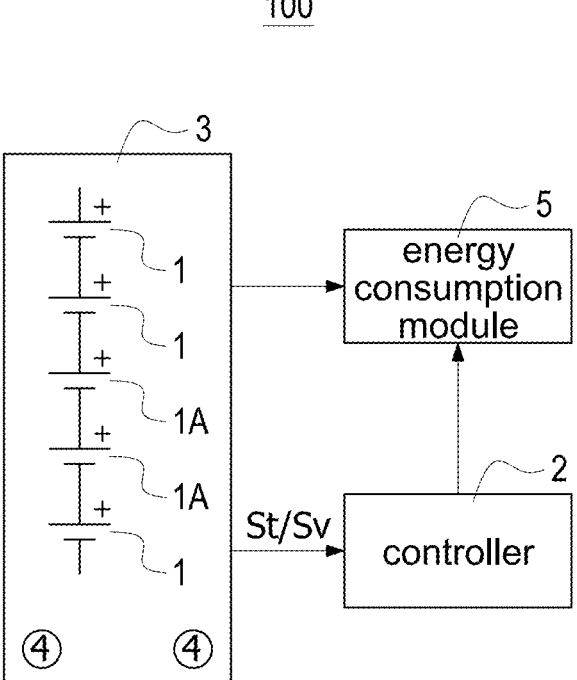
FIG. 2B is a block circuit diagram of a battery module capable of suppressing spread of battery fire of the present disclosure.

Specifically, please refer to FIG. 2B, which shows a block circuit diagram of a battery module capable of suppressing spread of battery fire of the present disclosure, and also refer to FIG. 2A. In addition to the battery packs 1 and the controller 2, the battery module 100 also includes a case 3, a plurality of temperature sensors 4 (such as two temperature sensors shown in the FIG. 2B) and an energy consumption module 5. The case 3 forms an accommodation space for accommodating the battery packs 1, and the temperature sensors 4 are dispersedly arranged in the accommodation space, so as to respectively detect an ambient temperature around their locations in the accommodation space. Since the temperature sensors 4 are mainly used to detect the temperature change of the battery packs 1 during operation, the temperature sensors 4 may be attached to the surface of the battery packs 1, or preferably arranged inside the battery packs 1. The controller 2 is coupled to the temperature sensors 4 and respectively receives the temperature signal St provided by the temperature sensors 4, so as to obtain the ambient temperature around each temperature sensor 4.

In one embodiment, in order to prevent a certain battery pack(s) 1 in the battery module 100 from thermal runaway due to abnormal temperature rise as shown in FIG. 1A, the controller 2 sets a first specific temperature range. When the controller 2 determines from the temperature signal St that the ambient temperature detected by a certain temperature sensor 4 arranged in the accommodation space is greater than or equal to the first specified temperature range, it means that one or several battery packs 1 around this temperature sensor 4 may have the abnormal temperature rise, so that the ambient temperature detected by this temperature sensor 4 is greater than or equal to the first specific temperature range.

Therefore, the controller 2 controls the energy consumption module 5 to consume a battery capacity of at least one battery pack 1 (hereinafter referred to as the abnormal battery pack(s) 1A to be distinguished from the normal battery pack(s) 1) around the temperature sensor 4, and during this period, the controller 2 continually detects various parameters (for example but not limited to, voltage, current, temperature and/or time) of the battery module 100 through various sensor(s), detection circuit(s) and/or timer(s). For example, the battery module 100 may include a plurality of voltage sensors (not shown in FIG.), the voltage sensors are respectively coupled to the battery pack 1 and the controller 2, and respectively detect a battery voltage (for example but not limited to, 4.2V) of the battery pack 1 to respectively provide the voltage signal Sv to the controller 2, so that the controller 2 may obtain the battery voltage value of each battery pack 1 through the voltage signals Sv.

The abnormal battery pack(s) 1A is determined according to the location where the temperature sensor 4 is arranged. Since the temperature sensor 4 detects its surrounding environment, it means that the surrounding environment of the temperature sensor 4 includes the abnormal working battery pack(s) (i.e. abnormal battery pack(s) 1A), and may also include a normal working battery pack(s) (i.e. normally battery pack(s) 1). However, in order to discharge the abnormal battery pack(s) 1A, it is generally to discharge all possible related battery packs 1 around this temperature sensor 4, so the abnormal battery pack(s) 1A may be defined as including at least one abnormal working battery pack (of course it may also include the normal working battery pack(s) 1).

Afterward, when the controller 2 determines that the parameter(s) corresponding to the abnormal battery pack(s) 1A satisfy a specific condition, it means that the battery capacity of the abnormal battery pack(s) 1A is consumed to a safe amount, so the controller 2 controls the energy consumption module 5 to stop consuming the battery capacity of the abnormal battery pack(s) 1A. The above-mentioned first operation method will be further described hereinafter. The second operation method is that the controller 2 still continually controls the energy consumption module 5 to consume the battery capacity of the abnormal battery pack(s) 1A, so that the battery capacity of the abnormal battery pack(s) 1A is discharged to a low power level (for example but not limited to, 5%) or an empty power level. Furthermore, it usually takes time for the first battery pack 1 with abnormality to change from abnormal temperature rise in the internal battery cell to the thermal runaway. Therefore, the battery capacity of this battery pack 1 with abnormality is quickly consumed through the energy consumption module 5, thereby suppressing the impact caused by the spread of the battery fire, also ensuring that the fire will not completely spread after the thermal runaway of the battery cell, and improving the safety of the battery system.

The first specific temperature range may be a range value constituted with temperature values such as a first temperature difference threshold and a first temperature threshold. Under the condition that the first specific temperature range is the first temperature difference threshold, and when the controller 2 obtains from the temperature signal St that a temperature difference (for example but not limited to, 22 degrees) of the ambient temperature (for example but not limited to, 62 degrees) detected by the temperature sensor(s) 4 of the abnormal battery pack(s) 1A and the ambient temperature (for example but not limited to 40 degrees, generally the lowest value may be taken) detected by the one of remaining of the temperature sensor 4 (i.e. normal working battery pack(s) 1) is greater than or equal to the first temperature difference threshold (for example but not limited to, 20 degrees), it means that the controller 2 determines that the ambient temperature is greater than or equal to the first specific temperature range. At this time, the controller 2 may control the energy consumption module 5 to consume the battery capacity of the abnormal battery pack(s) IA to suppress the impact caused by the spread of the battery fire.

Under the condition that the first specific temperature range is the first temperature threshold, and when the controller 2 obtains from the temperature signal St that the ambient temperature (for example but not limited to, 92 degrees) detected by the temperature sensor(s) 4 of the abnormal battery pack(s) 1A is greater than or equal to the first temperature threshold (for example but not limited to, 90 degrees), it means that the controller 2 determines that the ambient temperature is greater than or equal to the first specific temperature range. At this time, the controller 2 may control the energy consumption module 5 to consume the battery capacity of the abnormal battery pack(s) 1A to suppress the impact caused by the spread of the battery fire.

Referring again to FIG. 2B, the energy consumption module 5 is mainly used to consume the battery capacity of the abnormal battery pack(s) 1A, any device that may quickly consume the battery capacity of the abnormal battery pack(s) 1A, or suppress the temperature rise speed of abnormal battery pack(s) 1A may be used as the energy consumption module 5. Therefore, the energy consumption module 5 may preferably use a device with high power consumption, or a heat sink device for reducing the temperature of the abnormal battery pack(s) 1A. Most preferably, the combination of the above devices may be used to achieve the effect of rapidly consuming the battery capacity and suppressing the temperature rise speed of the abnormal battery pack(s) 1A.

Figure 3A:
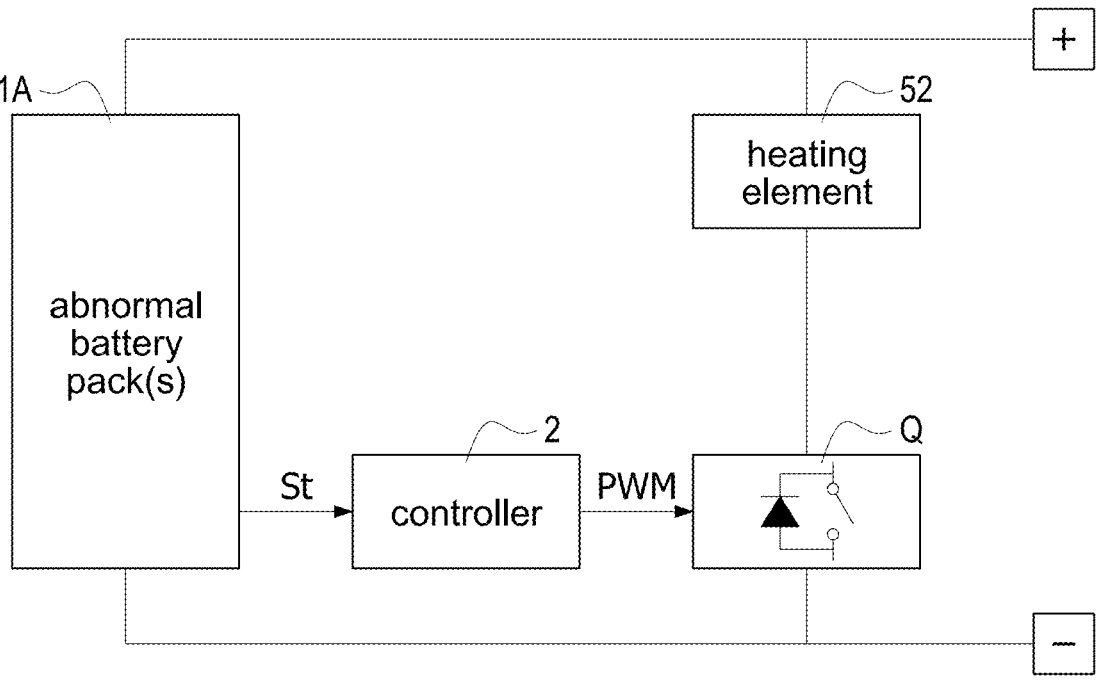
FIG. 3A is a block circuit diagram of an energy consumption module according to a first embodiment of the present disclosure.

Please refer to FIG. 3A, which shows a block circuit diagram of an energy consumption module according to a first embodiment of the present disclosure, and also refer to FIGS. 2A-2B. The energy consumption module 5 may include a heating element 52, and the heating element 52 may be, for example but not limited to, heater film(s), PTC ceramic heating element(s), electric heating coil(s), and other elements capable of heating with electricity. When the controller 2 obtains from the temperature signal St that the ambient temperature detected by a certain temperature sensor 4 is greater than or equal to the first specific temperature range, the controller 2 controls the heating element 52 to consume the battery capacity of the battery pack 1 (i.e. the abnormal battery pack(s) 1A) around this temperature sensor 4. In this way, the heating element 52 consumes the battery capacity of the abnormal battery pack(s) 1A to generate heat, and the heat may be dissipated by means, for example but not limited to air cooling, liquid cooling or heat conduction. In one embodiment, the heating element 52 may usually be controlled by the controller 2 to be coupled to the power source (here refers to the abnormal battery pack(s) 1A) to make the heating element 52 continually generate heat. However, if it is necessary to control the amount of heat generated, the controller 2 may implement it by controlling turn on/off of the switch(s).

Specifically, in one embodiment, the heating element 52 is the heater film(s). The energy consumption module 5 further includes a switch Q, and the switch Q is coupled to the heating element 52 and the controller 2. When the controller 2 obtains from the temperature signal St that the ambient temperature of the abnormal battery pack(s) IA is greater than or equal to the first specified temperature range, the controller 2 provides, for example but not limited to, a turn on/off signal, a pulse width modulation signal PWM, to control the switch Q to be turned on/off, so that the heating element 52 is controlled to consume the battery capacity of the abnormal battery pack(s) 1A to generate heat. The controller 2 may control the heat generated by the heating film by adjusting the pulse width modulation signal PWM (for example but not limited to, the duty ratio is adjusted from 0% to 100%, or the frequency adjustment of pulse frequency modulation PFM, etc.) to control the amount of heat generated by the heater film(s). In this way, it is possible to avoid the situation that the heater film(s) continuously generates too much heat, resulting in excessive heat accumulation and insufficient heat dissipation.

Figure 3B:
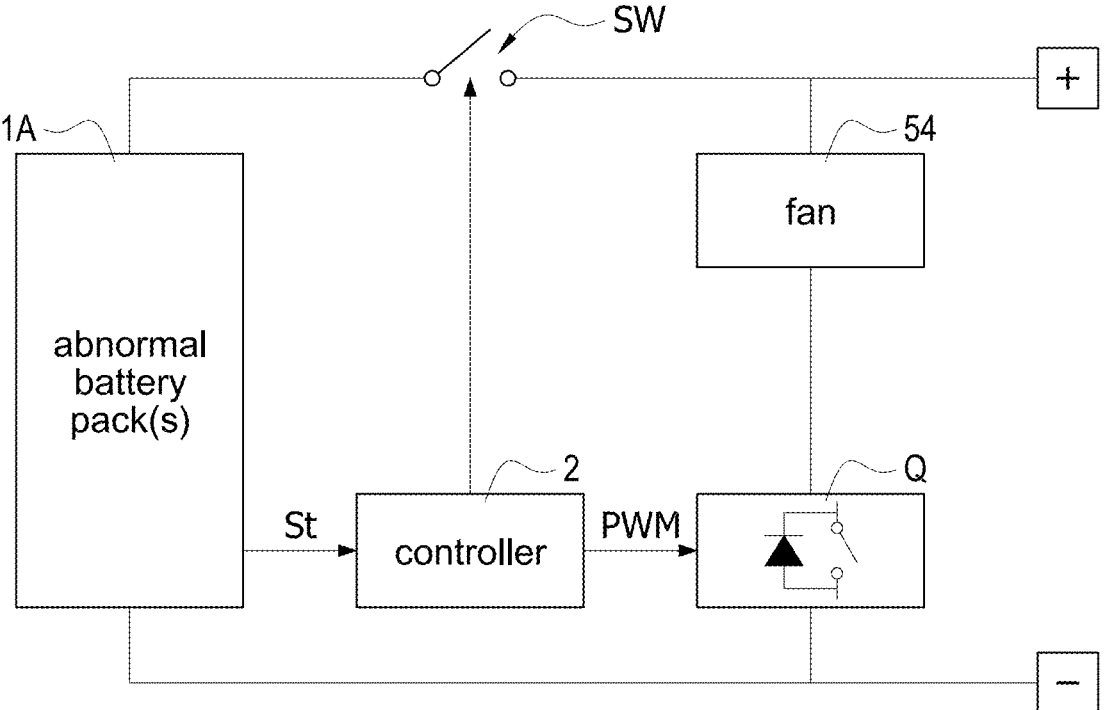
FIG. 3B is a block circuit diagram of the energy consumption module according to a second embodiment of the present disclosure.

Please refer to FIG. 3B, which shows a block circuit diagram of the energy consumption module according to a second embodiment of the present disclosure, and also refer to FIGS. 2A-3A. The energy consumption module 5 may include a fan 54, and when the controller 2 obtain from the temperature signal St that the ambient temperature of the abnormal battery pack(s) 1A is greater than or equal to the first specific temperature range, the controller 2 may control the abnormal battery pack(s) 1A to be coupled to the fan 54 by controlling a start switch SW to be turned on. In this way, the fan 54 may consume the battery capacity of the abnormal battery pack(s) 1A and generate an airflow flowing to the battery packs 1. The fan 54 may be arranged on any side of the battery module 100, and in one embodiment, the number of the fans 54 is not limited.

On the other hand, the controller 2 may also adjust the speed of the fan 54 by providing the pulse width modulation signal PWM. Specifically, the energy consumption module 5 may further include a switch Q, and the switch Q is coupled to the fan 54 and the controller 2. When the controller 2 obtains from the temperature signal St that the ambient temperature of the abnormal battery pack(s) 1A is greater than or equal to the first specific temperature range, the controller 2 provides the pulse width modulation signal PWM to control the switch Q to be turned on/off. Moreover, the controller 2 may adjust a rotation speed of the fan 54 by, for example but not limited to, adjusting the duty ratio of 0%~100% of the pulse width modulation signal PWM (or the frequency adjustment). In this way, the rotation speed of the fan 54 may be adaptively adjusted according to the ambient temperature.

Figure 3C:
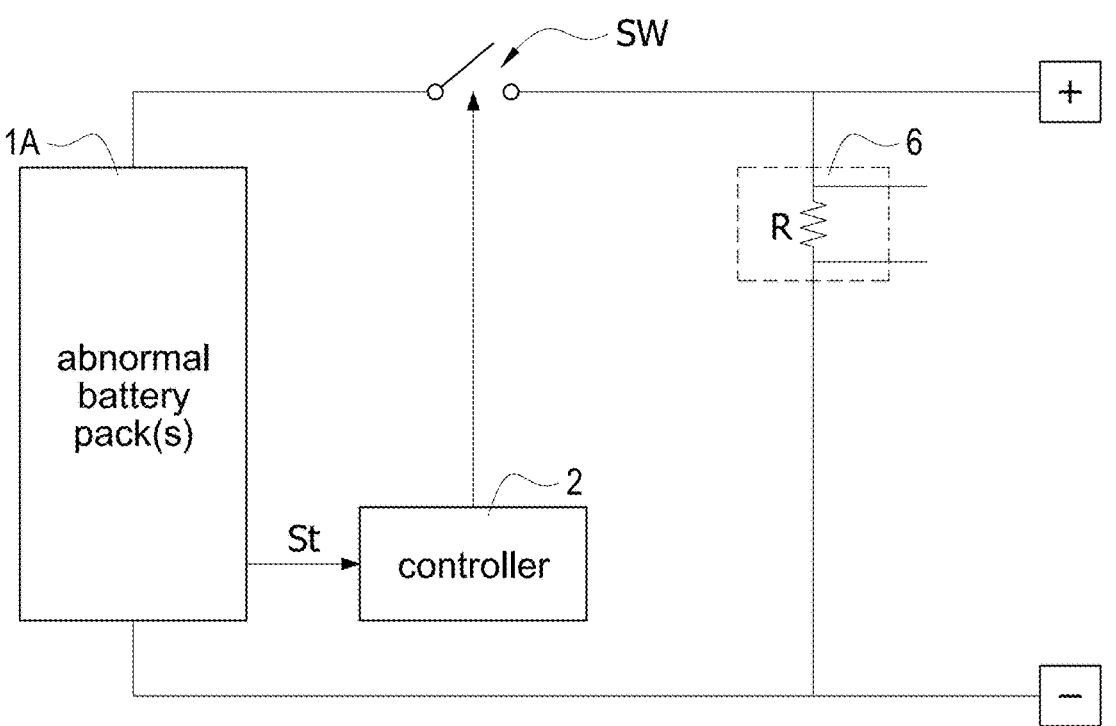
FIG. 3C is a block circuit diagram of the energy consumption module according to a third embodiment of the present disclosure.

Please refer to FIG. 3C, which shows a block circuit diagram of the energy consumption module according to a third embodiment of the present disclosure, and also refer to FIGS. 2A-3B. The battery module 100 may include a balance circuit 6, and the balance circuit 6 is coupled to the battery packs 1. The balance circuit 6 is configured to balance the battery capacity of the battery packs 1, and its main function is to make the battery capacity of all the battery packs 1 equal by consuming the battery capacity. Therefore, the balance circuit 6 includes a balance resistor R for consuming the battery capacity so that the battery capacity of all the battery packs 1 may be equal. In one embodiment, the energy consumption module 5 and the balance circuit 6 share the balance resistor R. Under normal operation of the battery module 100, the balance resistor R is configured to consume the battery capacity so that the battery capacity of all the battery packs 1 may be equal.

When the controller 2 obtains from the temperature signal St that the ambient temperature of the abnormal battery pack(s) 1A is greater than or equal to the first specific temperature range, the controller 2 may control the abnormal battery pack(s) 1A to be coupled to the balance resistor R by controlling the start switch SW to be turned on. In this way, the balance resistor R used to balance the battery capacity of all the battery packs 1 may be used to consume the battery capacity of the abnormal battery pack(s) 1A in this situation, and the effects of saving circuit components and reducing cost may be achieved. Generally speaking, when the balance resistor R is used to consume the battery capacity of the abnormal battery pack(s) 1A, the function of the balance circuit 6 for balancing the battery capacity of each battery pack 1 is disabled.

Figure 3D:
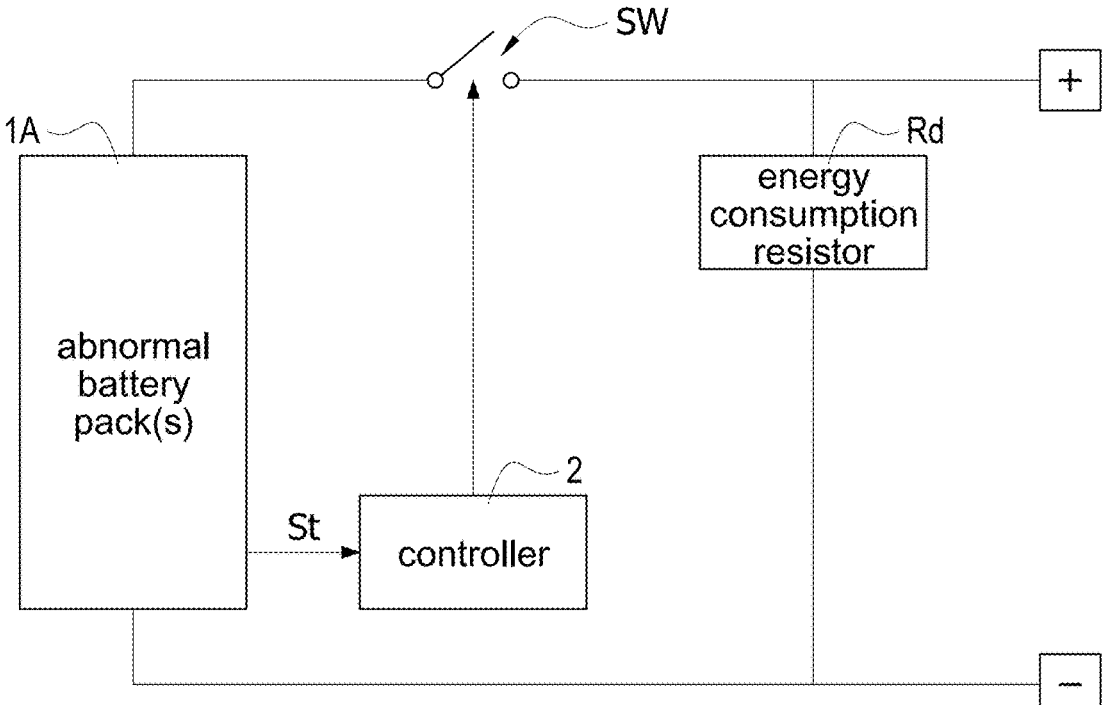
FIG. 3D is a block circuit diagram of the energy consumption module according to a fourth embodiment of the present disclosure.

Please refer to FIG. 3D, which shows a block circuit diagram of the energy consumption module according to a fourth embodiment of the present disclosure, and also refer to FIGS. 2A-3C. The difference between FIG. 3D and FIG. 3C is that the energy consumption resistor Rd in FIG. 3D is configured separately, and its operation mode is the same as FIG. 3C that when the controller 2 obtains from the temperature signal St that the ambient temperature of the abnormal battery pack(s) 1A is greater than or equal to the first specific temperature range. Therefore, the detailed description for FIG. 3D is not repeated here for brevity. Since the energy consumption resistor Rd is configured separately, it is not limited by other module requirements and is preferable to specify the specification of the energy consumption resistor Rd (for example but not limited to, resistor value, voltage stress/current stress, etc.). Therefore, according to the requirement of quickly consuming the battery capacity of the abnormal battery pack(s) 1A, the energy consumption resistor Rd may be configured with a high power consumption specification.

Figure 3E:
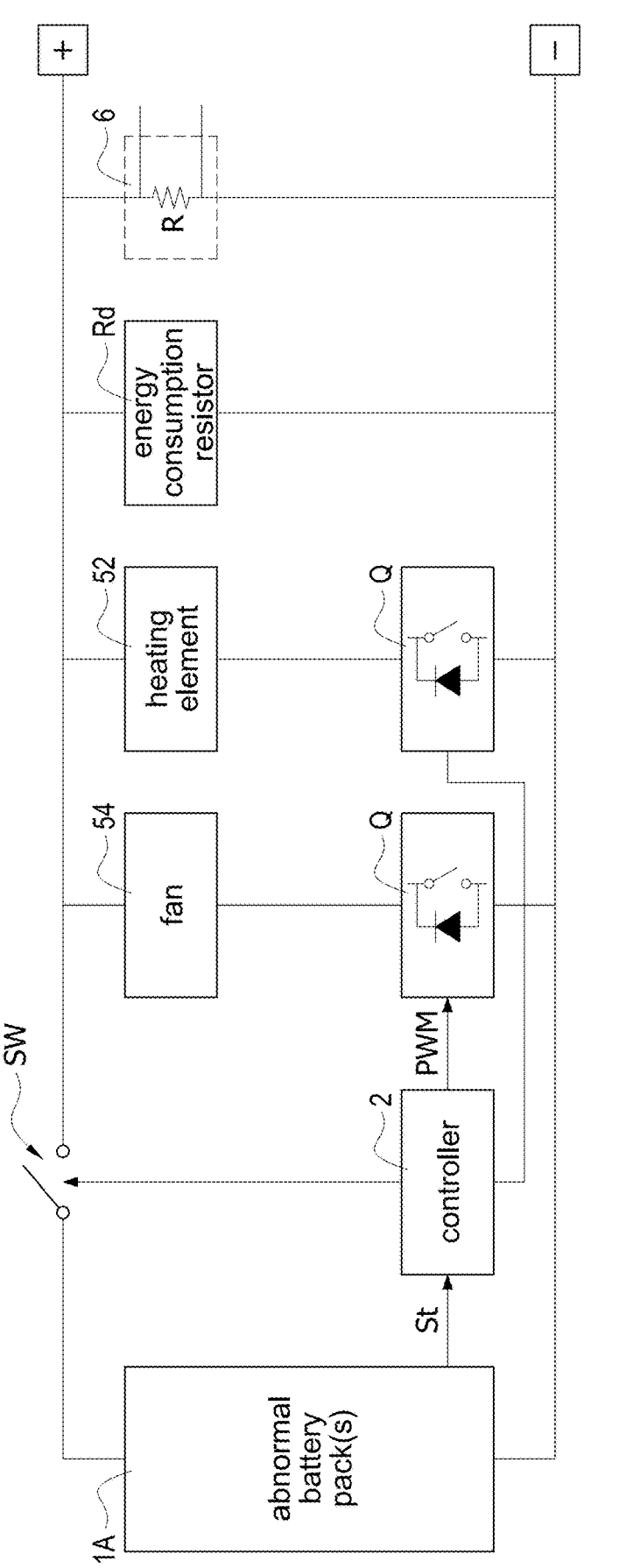
FIG. 3E is a block circuit diagram of the energy consumption module according to a fifth embodiment of the present disclosure.

Please refer to FIG. 3E, which shows a block circuit diagram of the energy consumption module according to a fifth embodiment of the present disclosure, and also refer to FIGS. 2A-3D. The energy consumption module 5 may include various elements for consuming the battery capacity of the abnormal battery pack(s) 1A, and it is not limited to selected one of the above FIGS. 3A-3D only or a combination thereof. Therefore, taking FIG. 3E as an example, the energy consumption module 5 may include the components shown in FIGS. 3A-3D and integrate the features of FIGS. 3A-3D. Based on the above integration, the heating element 52 may be used to generate heat, and the fan 54 may dissipate heat from the heating element 52. In addition, the consumption of the battery capacity of the abnormal battery pack(s) 1A may be accelerated by the balance resistor R and the energy consumption resistor Rd, so as to quickly consume the battery capacity of the abnormal battery pack(s) 1A to the safe amount.

Figure 4A:
FIG. 4A is an exploded view of a configuration structure of the battery module according to a first embodiment of the present disclosure.
Figure 4B:
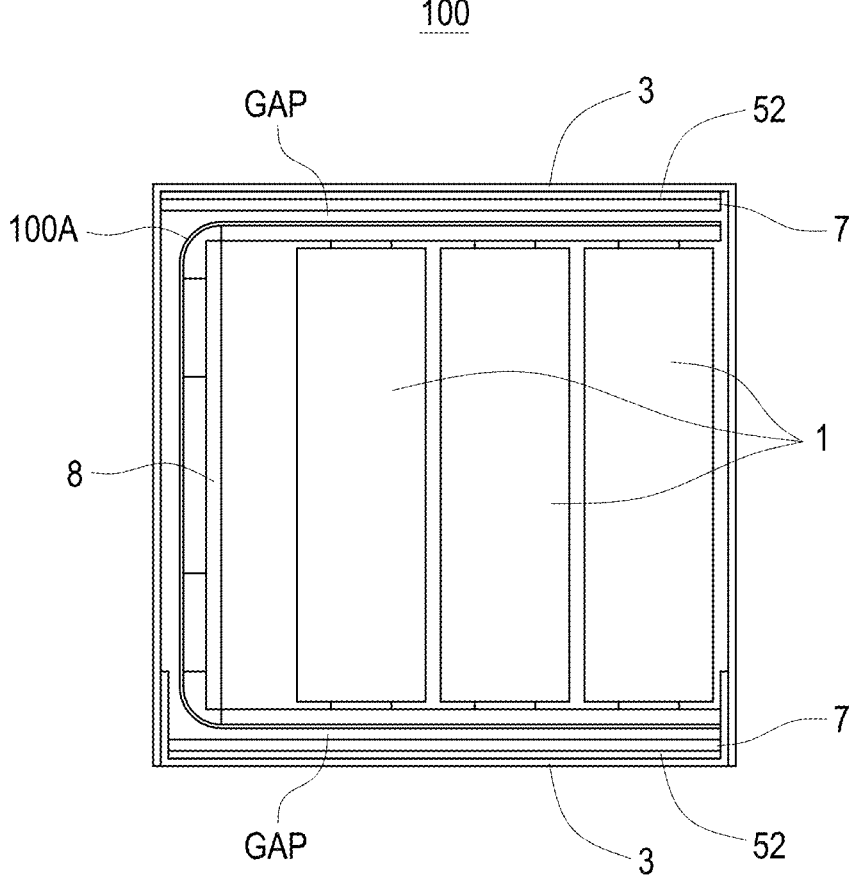
FIG. 4B is a cross-sectional view of the configuration structure of the battery module according to the first embodiment of the present disclosure.

Please refer to FIG. 4A, which shows an exploded view of a configuration structure of the battery module according to a first embodiment of the present disclosure, and also to FIG. 4B, which shows a cross-sectional view of the configuration structure of the battery module according to the first embodiment of the present disclosure, as well as also refer to FIGS. 2A-3E. In FIGS. 4A-4B, the battery module 100 applying the energy consumption module 5 of FIG. 3E is mainly shown. The battery module 100 includes the case 3, and the case forms the accommodating space S. The heating element 52 is arranged between the case 3 and the plurality of battery packs 1, and contacts the case 3. The contact refers to the physical contact between the case 3 and the heating element 52, and the effect of contact may be achieved by means of bonding, positioning, etc. A laminate 7 is also included between the heating element 52 and the battery packs 1, and the battery module 100 (the materials thereof is, for example but not limited to, materials with good plasticity such as polyester film etc.) utilizes, for example but not limited to, a film sheet 100A to hold the battery packs 1 and a circuit board 8 for controlling the battery packs 1. The temperature sensors 4 may be, for example but not limited to, distributed on the upper or lower surfaces of the battery packs 1, or embedded in the battery packs 1. The circuit board 8 may include, for example but not limited to, the above controller 2, balance circuit 6, balance resistor R, energy consumption resistor Rd and so on, and other circuit elements for controlling the battery packs 1.

The case 3 and the laminate 7 may be made of materials with better thermal conductivity (for example but not limited to metal), so that the heat generated by the heating element 52 may be conducted to external environment of the case 3. On the other hand, the heating element 52 is, for example but not limited to, heating film(s) and the fan 54 (not shown in FIG. 4A) is, for example but not limited to, arranged on one of the short sides of the battery packs 1 to generate airflow from one of the short sides through the direction of the battery packs 1 to the other of the short sides. In this way, the fan can dissipate heat from the battery packs 1, the heating element 52 and the laminate 7 with better thermal conductivity. In addition, in order to maintain better fluidity of the airflow, an airflow gap GAP is formed between the heating element 52 and the battery packs 1 (preferably formed between the laminate 7 and the battery pack 1) to guide the airflow from the one of the short sides through the direction of the battery packs 1 to the other of the short sides.

Furthermore, the heating element 52 uses heater film mainly because the size, shape and impedance thereof may be customized, the thickness is flat and may be pasted on the insulating layer (i.e. the case 3 and the laminate 7), and it may also have built-in over-temperature protection parts. The heater film attached to the metal material may also effectively dissipate heat, maximize the discharge consumption, and will not hinder the air duct (that is, the airflow gap GAP). The heater film itself may also be pasted on the iron piece for heat dissipation and temperature uniformity, and may also stop the flame eruption of the battery cells inside the battery packs 1 and suppress the impact caused by the spread battery fire. Therefore, the heater film and the case 3 can form two barriers to prevent the battery fire in the battery packs 1 from spreading and breaking out the case 3.

Figure 5A:
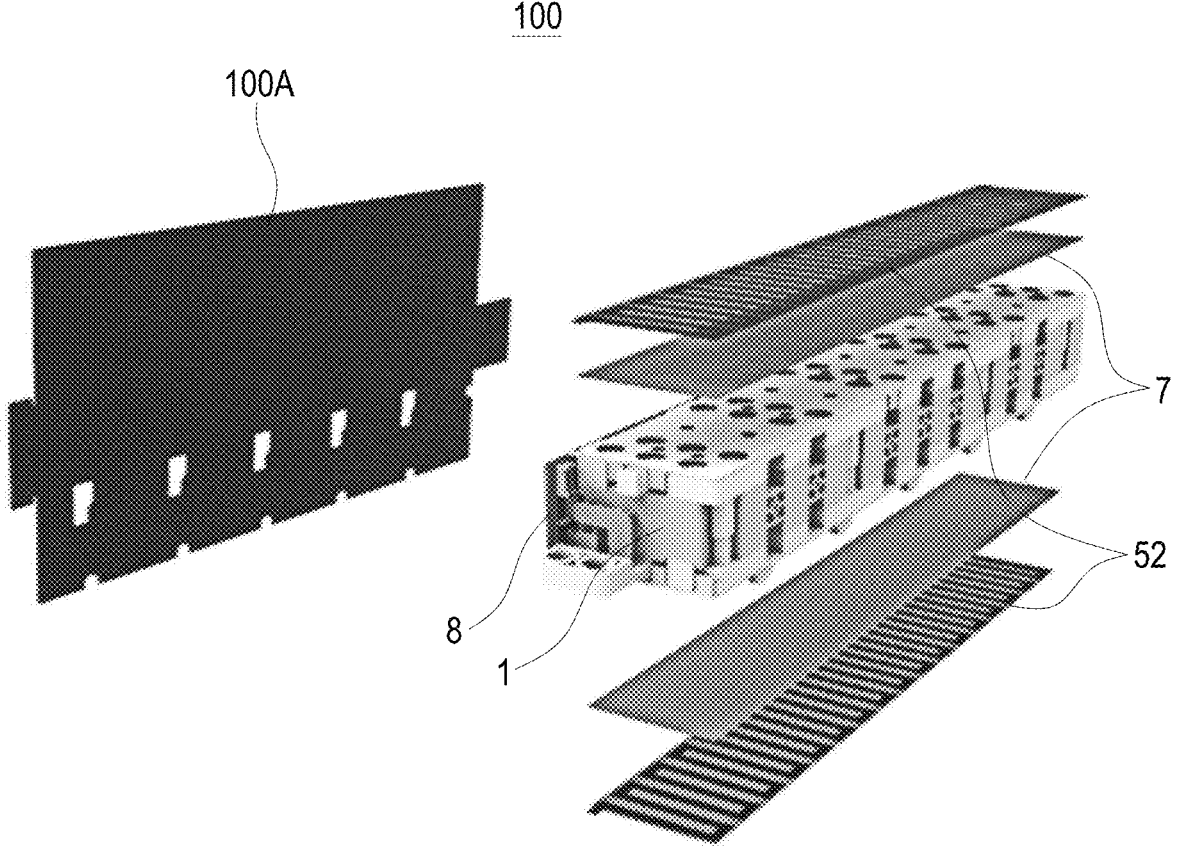
FIG. 5A is an exploded view of a configuration structure of the battery module according to a second embodiment of the present disclosure.
Figure 5B:
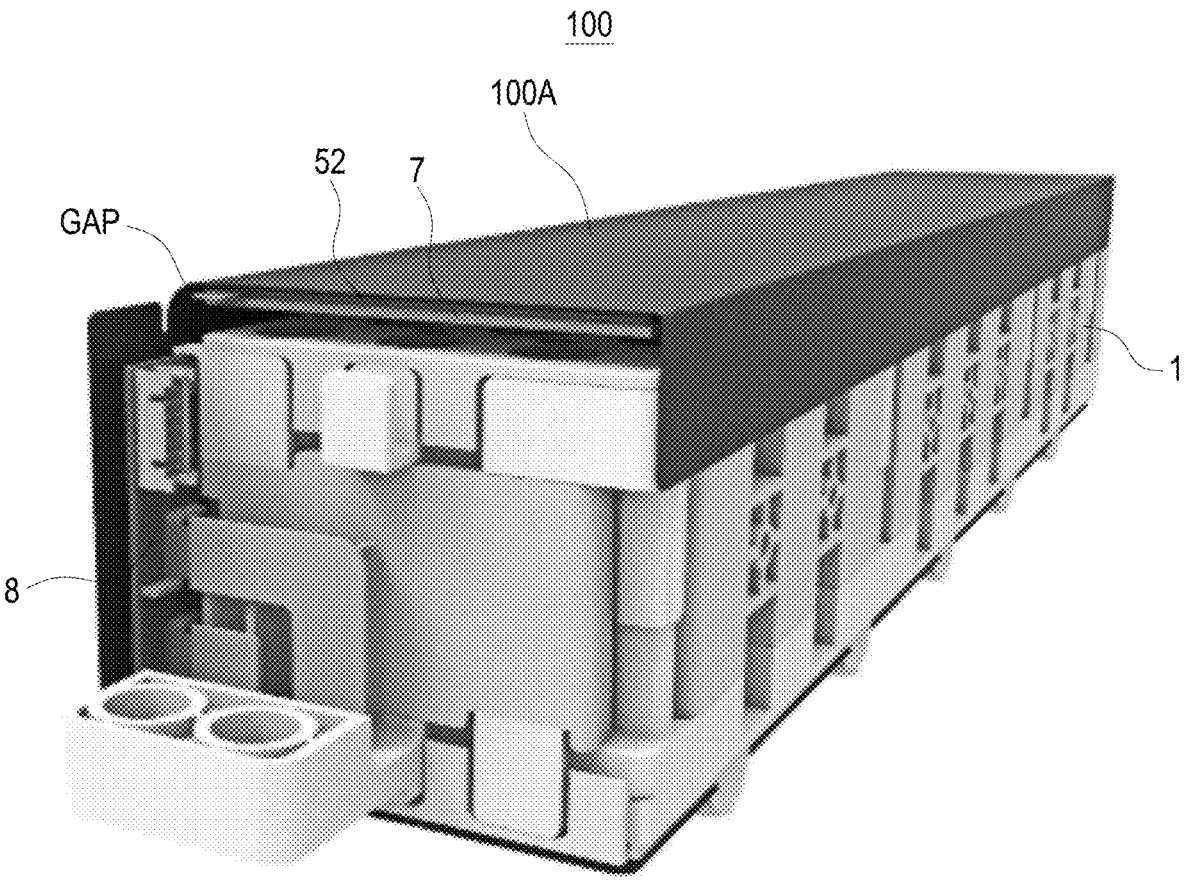
FIG. 5B is a cross-sectional view of the configuration structure of the battery module according to the second embodiment of the present disclosure.

Please refer to FIG. 5A, which shows an exploded view of a configuration structure of the battery module according to a second embodiment of the present disclosure, and to FIG. 5B, which shows a cross-sectional view of the configuration structure of the battery module according to the second embodiment of the present disclosure, as well as also refer to FIGS. 2A-3E. In FIGS. 4A-4B, the battery module 100 applying the energy consumption module 5 of FIG. 3E is mainly shown. The difference between FIGS. 5A-5B and FIGS. 4A-4B is that the film sheet 100A in FIGS. 5A-5B is used as the case 3 and may also form the accommodation space S. The heating element 52 is arranged between the film sheet 100A serving as the case 3 and the battery pack 1, and contacts the film sheet 100A. The laminate 7 is also included between the heating element 52 and the battery packs 1, and the airflow gap GAP may also be formed. In one embodiment, the positions and functions of other undescribed components are the same as those in FIGS. 4A-4B, and the detailed description thereof will not be repeated here for brevity.

Figure 6A:
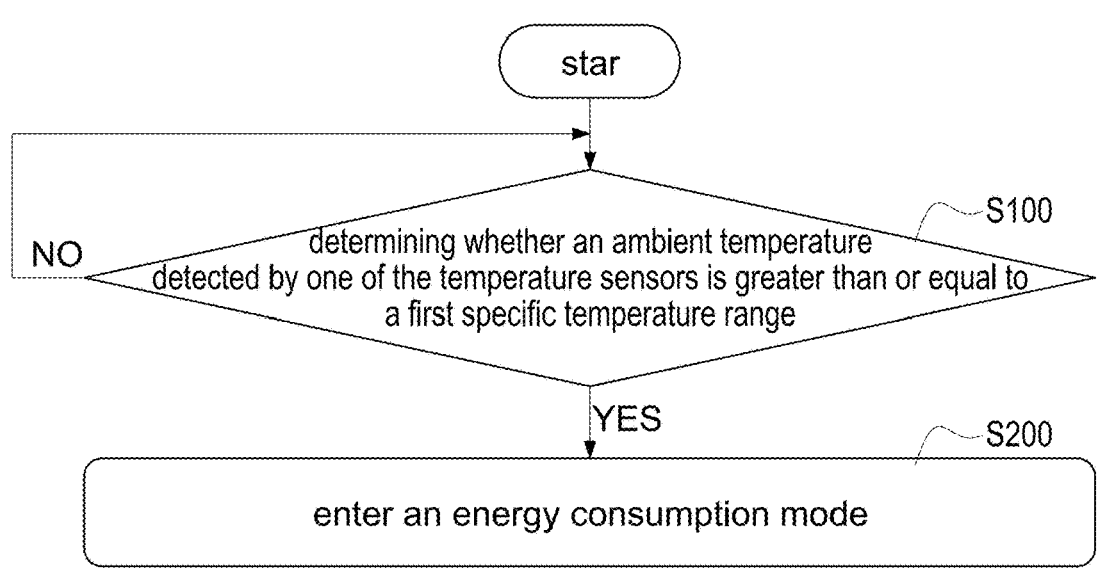
FIG. 6A is a flowchart of a control method of the battery module according to a first embodiment of the present disclosure.

Please refer to FIG. 6A, which shows a flowchart of a control method of the battery module according to a first embodiment of the present disclosure, and also refer to FIGS. 2A-5B. The method shown in FIG. 6A is mainly to prevent a certain battery pack(s) 1 in the battery module 100 from thermal runaway due to abnormal temperature rise as shown in FIG. 1A, and to suppress the impact caused by the spread of the battery fire. Therefore, the control method of suppressing spread of battery fire determines whether an ambient temperature detected by one of the temperature sensors is greater than or equal to a first specific temperature range (S100). In one embodiment, the first specific temperature range may be set by the controller 2, and the controller 2 determines whether the ambient temperatures detected by the temperature sensors 4 configured in the accommodation space S is greater than or equal to the first specific temperature range through the temperature signals St.

Then, when the controller 2 determines from the temperature signal St that the ambient temperature detected by the certain temperature sensor 4 arranged in the accommodation space S is greater than or equal to the first specific temperature range, it means that one or several battery packs 1 around this temperature sensor 4 may have the abnormal temperature rise, so that the controller 2 activates the energy consumption module 5 to enter an energy consumption mode (S200). Otherwise, the method returns to the step (S100).

In the step (S200), the controller 2 controls the energy consumption module 5 to consume the battery capacity of the abnormal battery pack(s) 1A around this temperature sensor 4, so that the battery capacity of the abnormal battery pack(s) 1A is discharged to a low power level (for example but not limited to, 5%) or an empty power level. After the battery capacity of the abnormal battery pack(s) 1A is discharged to the low power level or the empty power level, the steps of FIG. 6A is ended, and in these steps, the energy consumption module 5 will not stop consuming the battery capacity of the abnormal battery pack(s) 1A because the battery capacity of the abnormal battery pack(s) 1A is discharged to the low power level or the empty power level.

Figure 6B:
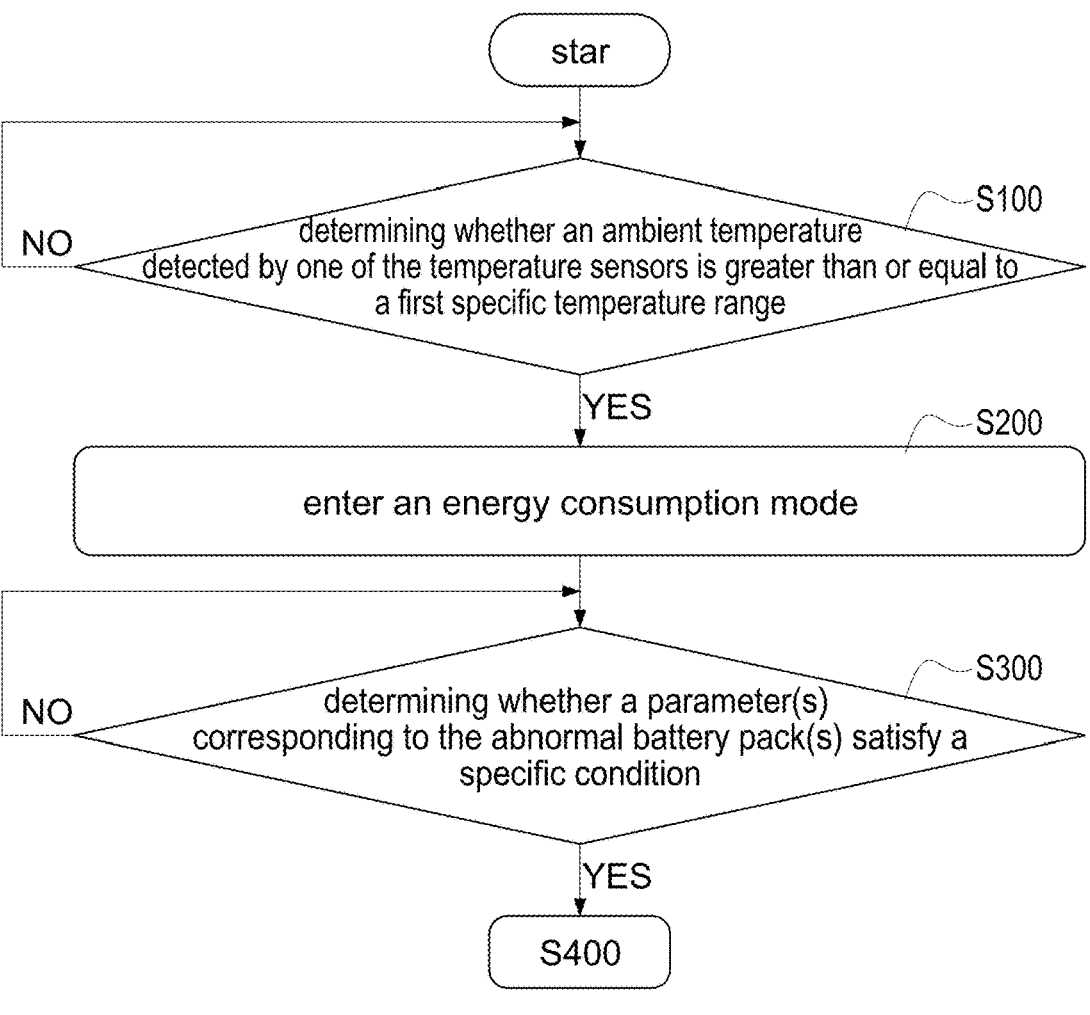
FIG. 6B is a flowchart of the control method of the battery module according to a second embodiment of the present disclosure.

Please refer to FIG. 6B, which shows a flowchart of the control method of the battery module according to a second embodiment of the present disclosure, and also refer to FIGS. 2A-6A. The difference between FIG. 6B and FIG. 6A is that after the step (S200) in FIG. 6B, it further determines whether a parameter(s) corresponding to the abnormal battery pack(s) satisfy a specific condition (S300). In one embodiment, the step (S300) continually detects various parameters (for example but not limited to, voltage, current, temperature and/or time) of the battery module 100 through various sensor(s), detection circuit(s) and/or timer(s). When the step (S300) is determined to be yes, the energy consumption module is controlled to stop consuming the battery capacity of the abnormal battery pack(s) and enter step (S400) to exit the energy consumption mode. Otherwise, the method returns to the step (S300) for continual detection and determination.

Figure 7A:
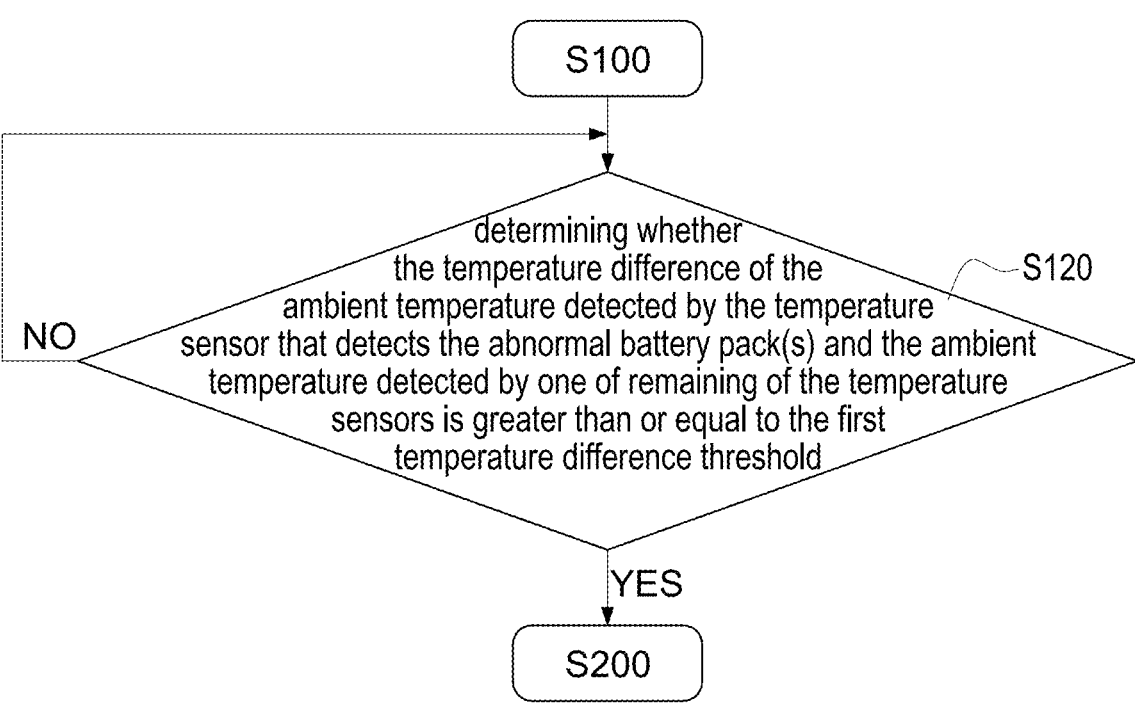
FIG. 7A is a flowchart of the control method for entering the energy consumption mode according to a first embodiment of the present disclosure.

Please refer to FIG. 7A, which shows a flowchart of the control method for entering the energy consumption mode according to a first embodiment of the present disclosure, and also refer to FIGS. 2A-6B. The controller 2 may pre-set the first specific temperature range as the first temperature difference threshold (for example but not limited to, 20 degrees), and the step (S100) further determines whether the temperature difference of the ambient temperature detected by the temperature sensor that detects the abnormal battery pack(s) and the ambient temperature detected by one of remaining of the temperature sensors is greater than or equal to the first temperature difference threshold (S120). If yes, it means that the temperature difference is greater than or equal to 20 degrees, and the controller 2 activates the energy consumption module 5 to enter the energy consumption mode (S200). Otherwise, the methods return to the step (S120) for continuous determination.

Figure 7B:
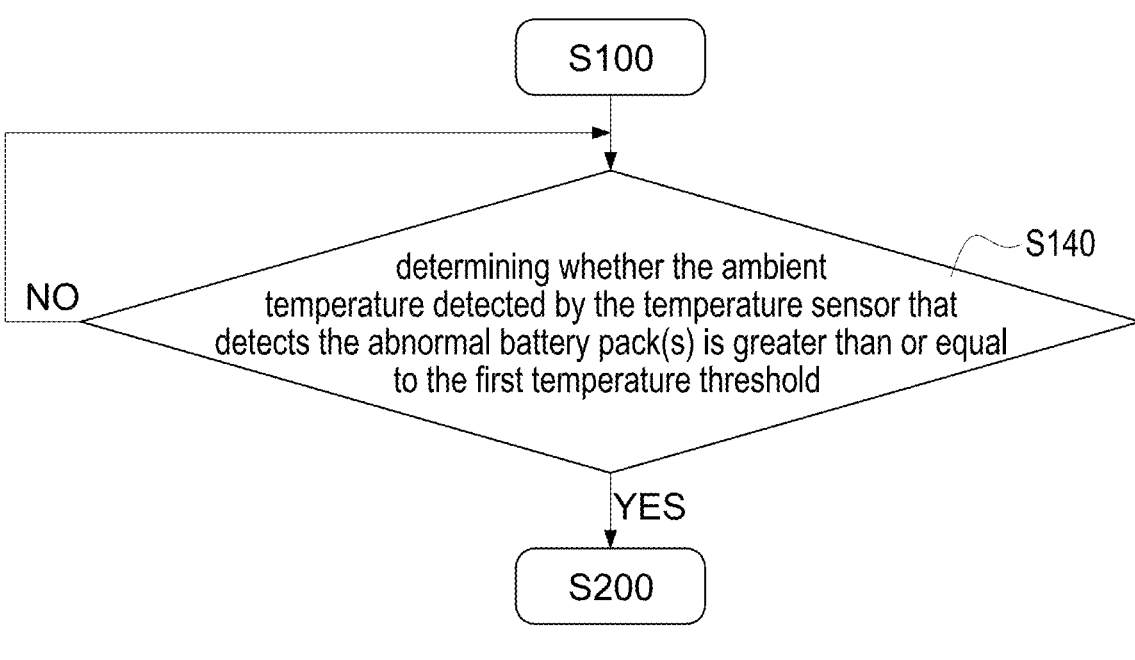
FIG. 7B is a flowchart of the control method for entering the energy consumption mode according to a second embodiment of the present disclosure.

Please refer to FIG. 7B, which shows a flowchart of the control method for entering the energy consumption mode according to a second embodiment of the present disclosure, and also refer to FIGS. 2A-7A. The controller 2 may pre-set the first specific temperature range as the first temperature threshold (for example but not limited to, 90 degrees), and the step (S100) further determines whether the ambient temperature detected by the temperature sensor that detects the abnormal battery pack(s) is greater than or equal to the first temperature threshold (S140). If yes, it means that the ambient temperature is greater than or equal to 90 degrees, and the controller 2 activates the energy consumption module 5 to enter the energy consumption mode (S200). Otherwise, the methods return to the step (S140) for continuous determination.

Figure 8A:
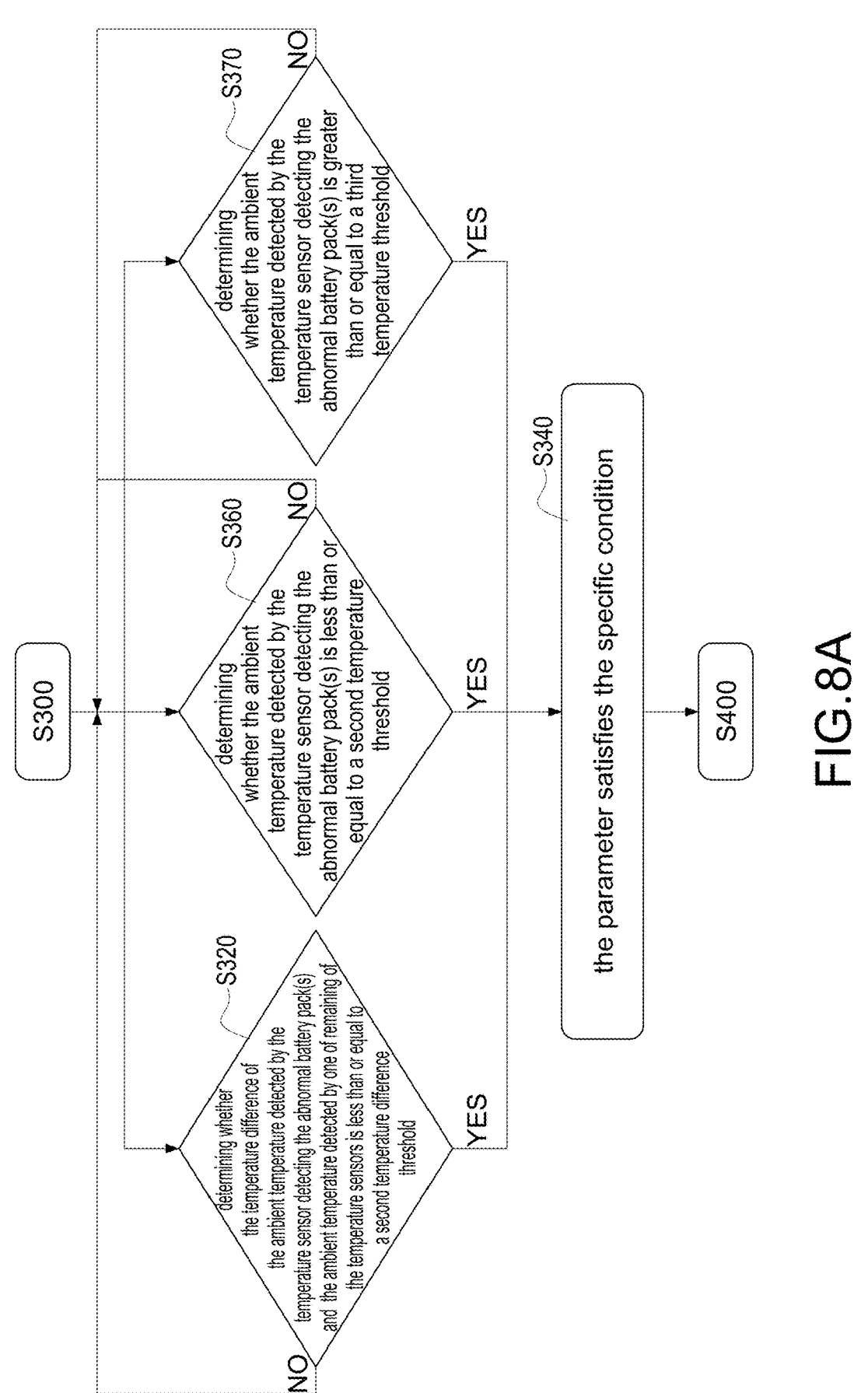
FIG. 8A is a flowchart of the control method for exiting the energy consumption mode according to a first embodiment of the present disclosure.

Please refer to FIG. 8A, which shows a flowchart of the control method for exiting the energy consumption mode according to a first embodiment of the present disclosure, and also refer to FIGS. 2A-7B. FIG. 8A is applicable to the process steps of FIG. 6B, the parameter is set as ambient temperature, and the specific condition is set as the second specific temperature range. The step (S300) further determines, when the second specific temperature range is the second temperature difference threshold, whether the temperature difference of the ambient temperature detected by the temperature sensor detecting the abnormal battery pack(s) and the ambient temperature detected by one of remaining of the temperature sensors is less than or equal to a second temperature difference threshold (S320). When the temperature difference is less than or equal to the second temperature difference threshold (for example but not limited to, the difference is less than 20 degrees), it means that the parameter satisfies the specific condition (S340) and the energy consumption module 5 is controlled to stop consuming the battery capacity of the abnormal battery pack(s) to enter the step (S400). Otherwise, the method returns to the step (S320) for continuous determination.

On the other hand, the step (S300) may further determine, when the second specific temperature range is the second temperature threshold, whether the ambient temperature detected by the temperature sensor detecting the abnormal battery pack(s) is less than or equal to a second temperature threshold (S360). when the ambient temperature is less than or equal to the second temperature threshold (for example but not limited to, the detected ambient temperature is less than 90 degrees), it means that the parameter satisfies the specific condition (S340) and the energy consumption module 5 is controlled to stop consuming the battery capacity of the abnormal battery pack(s) to enter the step (S400). Otherwise, the method returns to the step (S360) for continual determination. Generally, a possible scenario in the step (S360) is that, when the energy storage device A is actually running, and after the ambient temperature of the abnormal battery module 200A exceeds 90 degrees, the ambient temperature of the abnormal battery module 200A is lowered to be less than 90 degrees again due to the transfer of battery capacity and the heat dissipating of the fan 54, but it does not rule out other scenarios for the step (S360).

On the other hand, the step (S300) may further determine, when the second specific temperature range is the third temperature threshold, whether the ambient temperature detected by the temperature sensor detecting the abnormal battery pack(s) is greater than or equal to a third temperature threshold (S370). When the ambient temperature is greater than or equal to the third temperature threshold (for example but not limited to, the detected ambient temperature is above 150 degrees), it means that the parameter satisfies the specific condition (S340) and the energy consumption module 5 is controlled to stop consuming the battery capacity of the abnormal battery pack(s) to enter the step (S400). Otherwise, the, method returns to the step (S370) for continual determination. Generally, a possible scenario in the step (S370) is that, when the energy storage device A is performing the fire spread test, a set of battery modules 200 is deliberately selected to be heated to over 150 degrees (usually heated to 220 degrees), and the situation of energy storage device A burning is measured. After the ambient temperature exceeds 150 degrees, the abnormal battery module 200A may start to burn, so it is necessary to disable some (or all) of the controllable modules inside the abnormal battery module 200A before heating to more than 150 degrees, and the controllable modules that need to be disabled may be set. In particular, the fan 54 must be turned off to prevent the outside air introduced by the fan 54 from enhancing the spread of the battery fire after the abnormal battery module 200A starts to burn. Moreover, steps (S320) and (S360) may be performed selectively, and it is applicable that they may be integrated into one for determination.

Figures 8B, 8C:
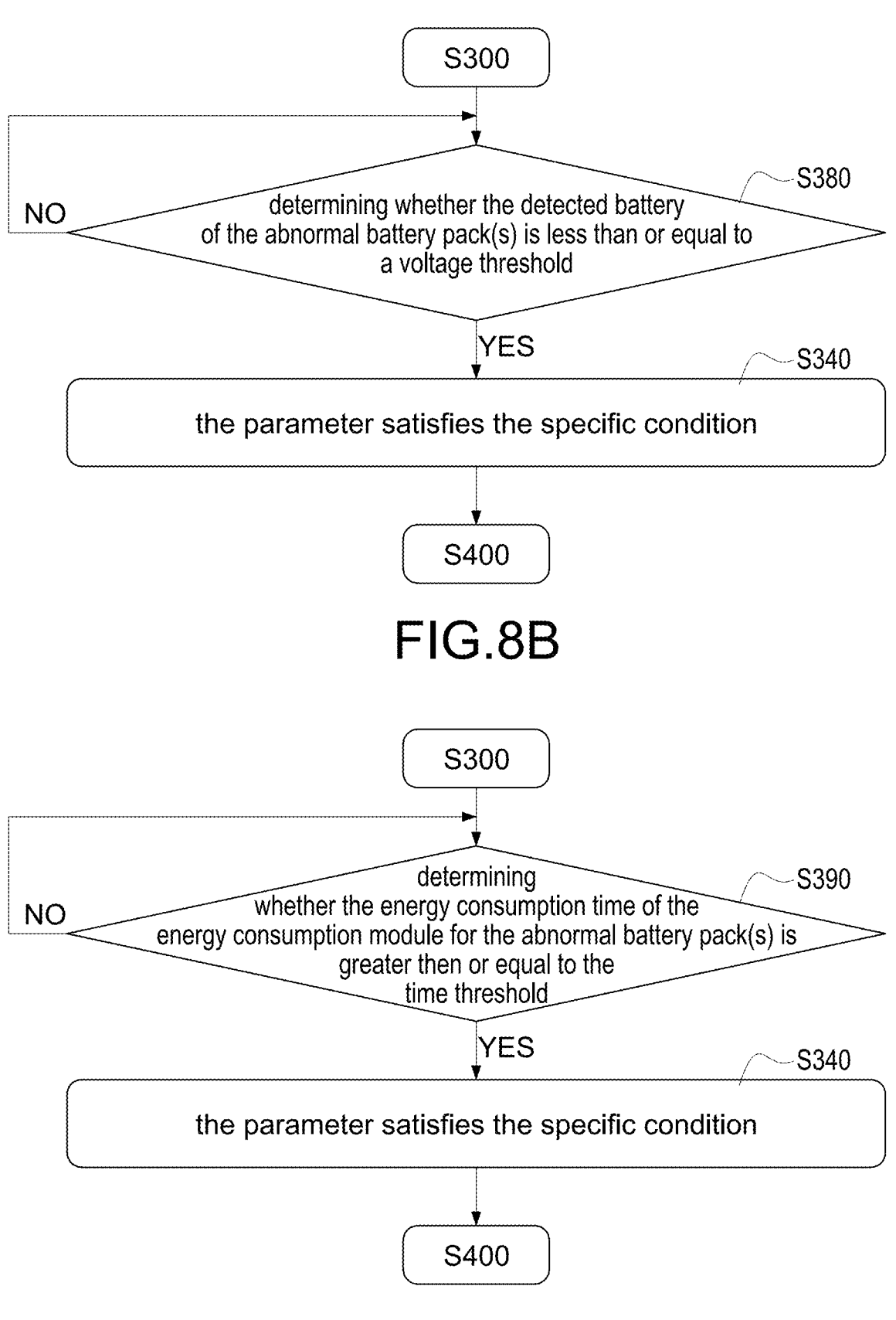
FIG. 8B is a flowchart of the control method for exiting the energy consumption mode according to a second embodiment of the present disclosure.
FIG. 8C is a flowchart of the control method for exiting the energy consumption mode according to a third embodiment of the present disclosure.

Please refer to FIG. 8B, which shows a flowchart of the control method for exiting the energy consumption mode according to a second embodiment of the present disclosure, and also refer to FIGS. 2A-8A. FIG. 8B is also applicable to the process steps of FIG. 6B, the parameter is set to the battery voltage, and the specific condition is set to the voltage threshold. The step (S300) further determines whether the detected battery voltage of the abnormal battery pack(s) is less than or equal to a voltage threshold (S380). When the battery voltage is less than or equal to the voltage threshold (for example but not limited to that the battery voltage is lower than the voltage threshold of 3.8V), it means that the parameter satisfies the specific condition (S340) and the energy consumption module 5 is controlled to stop consuming the battery capacity of the abnormal battery pack(s) to enter the step (S400). Otherwise, the method returns to the step (S380) for continuous determination.

Please refer to FIG. 8C, which shows a flowchart of the control method for exiting the energy consumption mode according to a third embodiment of the present disclosure, and also refer to FIGS. 2A-8B. FIG. 8C is also applicable to the process steps of FIG. 6B, the parameter is set to the energy consumption time, and the specific condition is set to the time threshold. The step (S300) further determines whether the energy consumption time of the energy consumption module for the abnormal battery pack(s) is greater than or equal to the time threshold (S390). When the energy consumption time is greater than or equal to the time threshold (for example but not limited to that the energy consumption time of the energy consumption module 5 is higher than the time threshold of 10 minutes), it means that the parameter satisfies the specific condition (S340) and the energy consumption module 5 is controlled to stop consuming the battery capacity of the abnormal battery pack(s) to enter the step (S400). Otherwise, the method returns to the step (S390) for continual determination. In one embodiment, the process steps not described in FIGS. 6A-8C are the same as those in FIGS. 2A-5B, and the description thereof will not be repeated here for brevity.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A control method of suppressing spread of battery fire, applied to a battery module comprising a case, and the battery module further comprises a plurality of battery packs connected in series or in parallel, a plurality of temperature sensors dispersedly configured to an accommodation space of the case, an energy consumption module, and the control method comprising:

determining whether an ambient temperature detected by one of the temperature sensors is greater than or equal to a first specific temperature range, and activating the energy consumption module to enter an energy consumption mode when the ambient temperature detected by the one of the temperature sensors is greater than or equal to the first specific temperature range, and the energy consumption mode comprises steps of:

(a) controlling the energy consumption module to consume the battery capacity of at least one battery pack around one of the temperature sensors, (b) determining whether a parameter corresponding to the at least one battery pack satisfy a specific condition, and (c) controlling the energy consumption module to stop consuming the battery capacity of the at least one battery pack to exit the energy consumption mode when the parameter satisfies the specific condition, wherein the parameter is set to be the ambient temperature, the specific condition is set to be a second specific temperature range, and the energy consumption mode further comprises:

(b1-1) determining whether the temperature difference of the ambient temperature detected by the one of the temperature sensors and an ambient temperature detected by one of remaining of the temperature sensors is less than or equal to a second temperature difference threshold when the second specific temperature range is the second temperature difference threshold, and (b1-2) determining the parameter satisfy the specific condition when the temperature difference is less than or equal to the second temperature difference threshold, or (b2-1) determining whether the ambient temperature detected by the one of the temperature sensors is less than or equal to a second temperature threshold when the second specific temperature range is the second temperature threshold, and (b2-2) determining the parameter satisfy the specific condition when the ambient temperature is less than or equal to the second temperature threshold, or (b3-1) determining whether the ambient temperature detected by the one of the temperature sensors is greater than or equal to a third temperature threshold when the second specific temperature range is the third temperature threshold, and (b3-2) determining the parameter satisfy the specific condition when the ambient temperature is greater than or equal to the third temperature threshold.

2. The control method of suppressing spread of battery fire as claimed in claim 1, wherein the first specific temperature range is a first temperature difference threshold, and the control method further comprises:

determining whether a temperature difference of the ambient temperature detecting by the temperature sensor and an ambient temperature detected by one of remaining of the temperature sensors is greater than or equal to the first temperature difference threshold, and entering the energy consumption mode when the temperature difference is greater than or equal to the first temperature difference threshold.

3. The control method of suppressing spread of battery fire as claimed in claim 1, wherein the first specific temperature range is a first temperature threshold, and the control method further comprises:

determining whether the ambient temperature detecting by the temperature sensor is greater than or equal to the first temperature threshold, and entering the energy consumption mode when the ambient temperature is greater than or equal to the first temperature threshold.

4. The control method of suppressing spread of battery fire as claimed in claim 1, wherein the energy consumption module comprises a heating element and a switch, and the energy consumption mode further comprises:

(a1) controlling the heating element to consume the battery capacity of the at least one battery pack to generate a heat, and (a2) conducting the heat through the case to an external environment.

5. The control method of suppressing spread of battery fire as claimed in claim 1, wherein the energy consumption module comprising a fan, and the energy consumption mode further comprises:

(a3) consuming the battery capacity of the at least one battery pack by coupling the at least one battery pack to the fan, and (a4) generating an airflow flowing to the battery packs by the fan.

6. The control method of suppressing spread of battery fire as claimed in claim 1, wherein the battery module further comprises a balance resistor, and the energy consumption mode further comprises:

(a5) consuming the battery capacity of the at least one battery pack by coupling the at least one battery pack to the balance resistor.

7. The control method of suppressing spread of battery fire as claimed in claim 1, wherein the battery module further comprises an energy consumption resistor, and the energy consumption mode further comprises:

(a6) consuming the battery capacity of the at least one battery pack by coupling the at least one battery pack to the energy consumption resistor.

8. The control method of suppressing spread of battery fire as claimed in claim 1, wherein the parameter is set to be a battery voltage, the specific condition is set to be a voltage threshold, and the energy consumption mode further comprises:

(b4-1) determining whether the battery voltage of the at least one battery pack is less than or equal to the voltage threshold, and (b4-2) determining the parameter satisfy the specific condition when the battery voltage is less than or equal to the voltage threshold.

9. The control method of suppressing spread of battery fire as claimed in claim 1, wherein the parameter is set be to an energy consumption time, the specific condition is set to be a time threshold, and the energy consumption mode further comprises:

(b5-1) determining whether the energy consumption time of the energy consumption module for the at least one battery pack is greater than or equal to the time threshold, and (b5-2) determining the parameter satisfy the specific condition when the energy consumption time is greater than or equal to the time threshold.

10. A battery module capable of suppressing spread of battery fire and configured to perform the control method of claim 1, the battery module comprising:

a case forming an accommodation space, a plurality of battery packs accommodated in the accommodation space, a plurality of temperature sensors dispersedly arranged in the accommodation space, and the temperature sensors configured to respectively detect an ambient temperature around arrangement locations, an energy consumption module, and a controller coupled to the temperature sensors, the controller configured to control the energy consumption module to consume a battery capacity of at least one battery pack around one of the temperature sensors when the ambient temperature detected by the one of the temperature sensors is greater than or equal to a first specific temperature range.

11. The battery module as claimed in claim 10, wherein the energy consumption module comprises:

a heating element arranged between the case and the battery packs, and being in contact with the case, wherein the controller is configured to control the heating element to consume the battery capacity of the at least one battery pack to generate heat when the ambient temperature detected by the one of the temperature sensors is greater than or equal to the first specific temperature range, and the heat is conducted through the case to an external environment.

12. The battery module as claimed in claim 11, wherein the energy consumption module comprises:

a fan arranged on one side of the battery module, and the controller configured to control the at least one battery pack to be coupled to the fan when the ambient temperature detected by the one of the temperature sensors is greater than or equal to the first specific temperature range, so that the fan consumes the battery capacity of the at least one battery pack to generate an airflow flowing to the battery packs.

13. The battery module as claimed in claim 12, wherein an airflow gap is formed between the heating element and the battery packs, and is configured to guide the airflow flowing from the one side to the other side of the battery module through the airflow gap.

14. The battery module as claimed in claim 10, further comprising:

a balance circuit coupled to the battery packs and configured to balance the battery capacity of the battery packs, wherein the balance circuit comprises a balance resistor, and the energy consumption module and the balance circuit share the balance resistor; the controller is configured to control the at least one battery pack to be coupled to the balance resistor when the ambient temperature detected by the one of the temperature sensors is greater than or equal to the first specific temperature range, so that the balance resistor consumes the battery capacity of the at least one battery pack.

15. The battery module as claimed in claim 10, wherein the energy consumption module comprises:

an energy consumption resistor, and the controller configured to control the at least one battery pack to be coupled to the energy consumption resistor when the ambient temperature detected by the one of the temperature sensors is greater than or equal to the first specific temperature range, so that the energy consumption resistor consumes the battery capacity of the at least one battery pack.

16. The battery module as claimed in claim 10, wherein the first specific temperature range is a first temperature difference threshold, the controller is configured to control the energy consumption module to consume the battery capacity of the at least one battery pack when a temperature difference of the ambient temperature detected by the one of the temperature sensors and an ambient temperature detected by one of remaining of the temperature sensors is greater than or equal to the first temperature difference threshold, or wherein the first specific temperature range is a first temperature threshold, and the controller is configured to control the energy consumption module to consume the battery capacity of the at least one battery pack based on the ambient temperature detected by the one of the temperature sensors being greater than or equal to the first temperature threshold.

17. The battery module as claimed in claim 10, wherein the controller is configured to control the at least one battery pack to be disconnected from the energy consumption module when the controller determines that a parameter corresponding to the at least one battery pack satisfies a specific condition.

18. The battery module as claimed in claim 17, wherein the parameter is the ambient temperature, and the specific condition is a second specific temperature range, wherein the second specific temperature range is a second temperature difference threshold, the controller is configured to determine that the parameter satisfies the specific condition when a temperature difference of the ambient temperature detected by the one of the temperature sensors and an ambient temperature detected by one of remaining of the temperature sensors is less than or equal to the second temperature difference threshold, wherein the second specific temperature range is a second temperature threshold, and the controller is configured to determine that the parameter satisfies the specific condition when the ambient temperature detected by the one of the temperature sensors is less than or equal to the second temperature threshold, or wherein the second specific temperature range is a third temperature threshold, and the controller is configured to determine that the parameter satisfies the specific condition when the ambient temperature detected by the one of the temperature sensors is greater than or equal to the third temperature threshold.

19. The battery module as claimed in claim 17, further comprising:

a plurality of voltage sensors respectively coupled to the battery packs and the controller, configured to respectively detect a battery voltage of the battery packs, wherein the parameter is the battery voltage, and the specific condition is a voltage threshold, the controller is configured to determine that the parameter satisfies the specific condition when the battery voltage of the at least one battery pack is less than or equal to the voltage threshold.

20. The battery module as claimed in claim 10, wherein the parameter is an energy consumption time, and the specific condition is a time threshold, the controller is configured to determine that the parameter satisfies the specific condition when the energy consumption time for the at least one battery pack by the energy consumption module is greater than or equal to the time threshold.

\* \* \* \* \*